Dec. 26, 1967  F. H. STEWART  3,359,919
LOAD LIFTING AND TRANSPORT SYSTEM AND METHOD
Filed Nov. 26, 1965  3 Sheets-Sheet 1
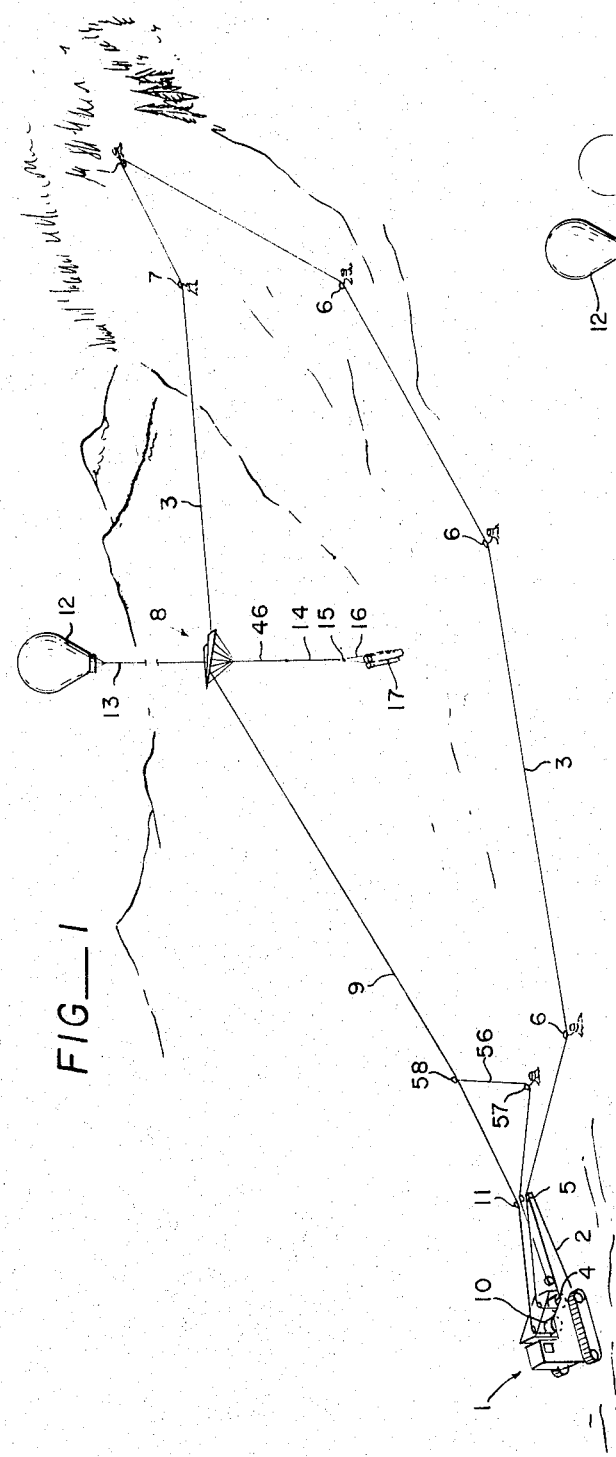
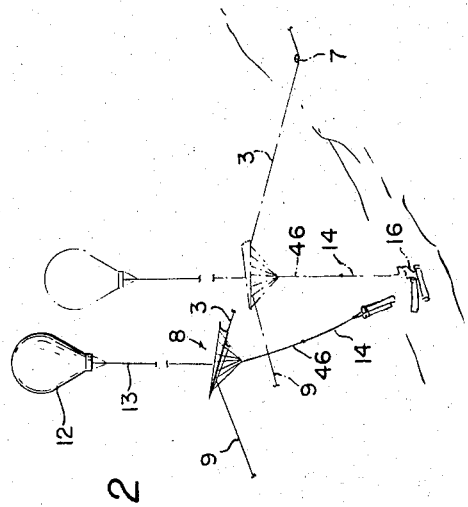
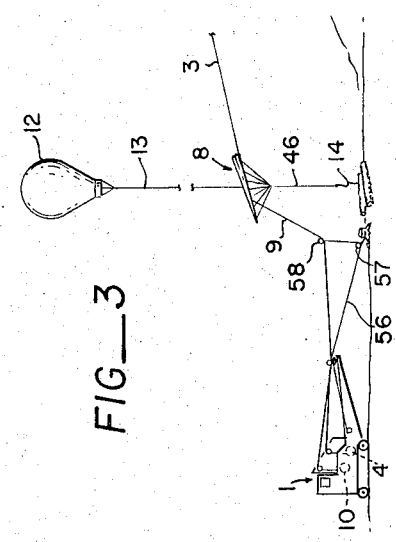
FAYE H. STEWART
INVENTOR.
BY *Seed & Berry*
ATTORNEYS

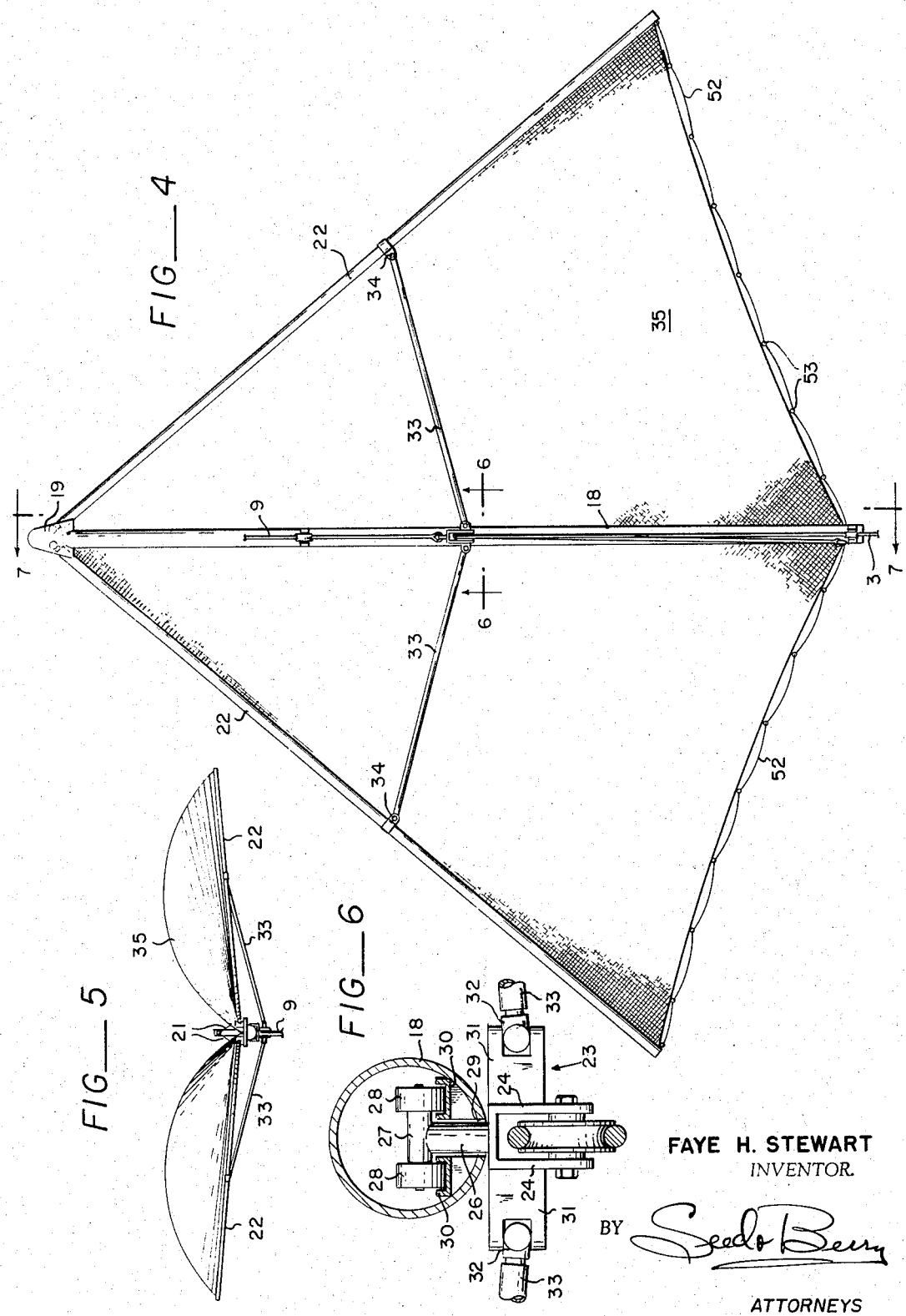

Dec. 26, 1967  F. H. STEWART  3,359,919
LOAD LIFTING AND TRANSPORT SYSTEM AND METHOD
Filed Nov. 26, 1965  3 Sheets-Sheet 3
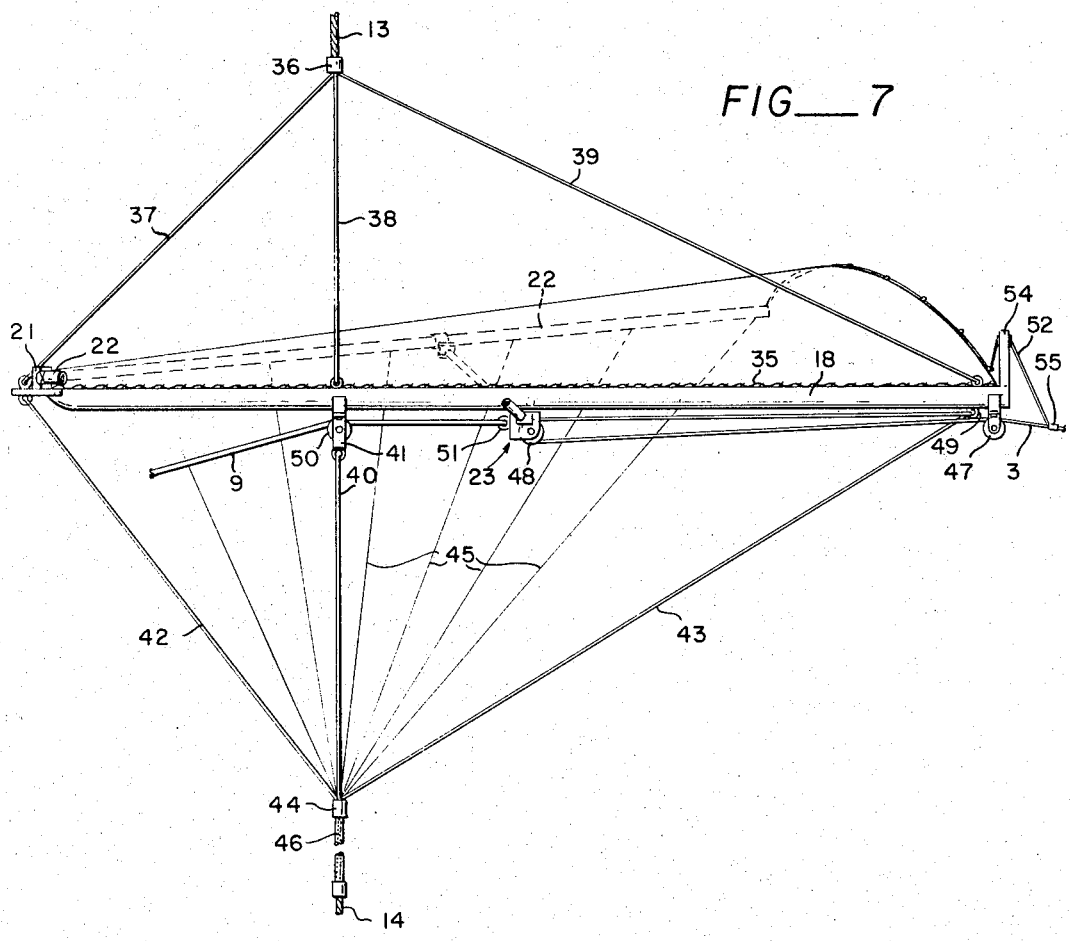
FIG__7
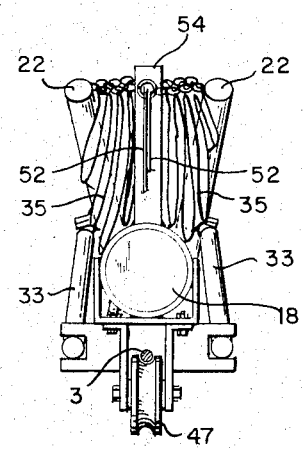
FIG__8
FAYE H. STEWART
INVENTOR.
ATTORNEYS

United States Patent Office 3,359,919
Patented Dec. 26, 1967

3,359,919
LOAD LIFTING AND TRANSPORT SYSTEM
AND METHOD
Faye H. Stewart, 2765 Fairmont Blvd.,
Eugene, Oreg. 97403
Filed Nov. 26, 1965, Ser. No. 509,697
14 Claims. (Cl. 104—22)

ABSTRACT OF THE DISCLOSURE

A cable hauling system having a main and haul back line and a yarder with winding drums for hauling in and paying out the lines. A collapsible lift wing is connected between the main and haul back lines such that tensioning the main line and winding in the haul back line serves to collapse the wing. Releasing the haul back line and winding in the main line serves to unfurl the wing. A loading cable is attached to the wing to lift a load when the wing is flown and a lighter-than-air static lift vehicle is connected above the wing to maintain it elevated from the ground.

Background of the invention

The present invention relates in general to load lifting and transport systems and more particularly to a novel method and rigging apparatus for raising and transporting heavy loads from one point to another on either land or water surface utilizing the aerodynamic lift capabilities of an airborne vehicle. According to the concepts of the present invention, the aerodynamic lift is obtained by a towed wing member the vertical lift characteristics of which are controlled through a cable hauling system having a lift-transport cycle from a pickup point to a load depositing point and a haulback or return cycle for returning the wing vehicle to the pickup point. In addition to the aerodynamic lift-wing, a lighter-than-air body such as a conventional gas filled balloon is used to provide enough static lift to maintain the wing member aloft at all times and to provide support for the portion of the cable hauling apparatus associated with the wing member.

In the prior art, many attempts have been made to utilize lighter-than-air vehicles such as gas filled balloons to provide the lift for supporting cargo or other loads but such attempts have generally met with unsatisfactory results because of the problems associated with the lighter-than-air vehicle and its control. Attempts to utilize merely the static lift of a balloon or the like have proven uneconomical and generally unsuccessful because of the limited lifting ability of the vehicle and because of the inability to control the balloon in conditions of high wind velocity etc. Even in the case of balloon applications to cargo carrying wherein the configuration of the balloon is such that aerodynamic lift, in addition to static lift, can be obtained, it has been experienced in practice that serious problems arise in maintaining directional control on the extremely large and cumbersome balloon body during reverse towing operations. Additionally, the balloon vehicle must be flown at extremely high altitudes which renders control even more difficult. It is also extremely difficult, if not impossible, to obtain the necessary lifting force at precisely the time during movement of the vehicle when it is needed the most, i.e. when initially lifting the load. The cost involved in building and maintaining a lighter than air vehicle of the capacity needed is also oftentimes out of proportion to the advantages gained by its use and the risk of loss through destruction of the vehicle is extremely great.

The present invention aims to overcome the deficiencies experienced in the past with airborne lifting vehicles by utilizing a relatively inexpensive lift-wing structure and an attached balloon of relative small capacity for maintaining only the weight of the wing and its rigging aloft. Because of the separation of the static lift balloon and the lift-wing, the lift wing may be operated relatively close to the surface and is therefore easily controlled by ground rigging for immediate and effective lift with relatively no time lag involved. In addition, provision is made for control of the wing which renders it unnecessary to turn the device around on return travel cycles as has been necessary in the past. The present invention provides for control of the degree of lift exerted by the wing during its flight as well as immediate application and release of the lifting force. The device of the present invention can be constructed and maintained for a fraction of the cost involved in balloon lifting apparatus known to the prior art.

Accordingly, the object of the present invention is to provide a load lifting apparatus and method utilizing a controlled airborne wing surface in combination with a support balloon for lifting and transporting loads in a more efficient and accurate manner than heretofore possible.

Another object of the present invention is to provide a load lifting and transport system and method which is highly simplified and more economic to construct and maintain than heretofore known in the prior art.

Other more particular objects and advantages of the present invention will, with the foregoing, appear and be understood from the following description and claims, the invention consisting of the novel construction and adaptation and combination of parts and the combination of method steps hereinafter described and claimed in connection with the presently preferred embodiment. Reference is now made to the accompanying drawings in which:

FIG. 1 is a perspective view of the overall system according to a preferred form;

FIG. 2 illustrates the manner in which immediate aerodynamic lift is obtained for lifting a load;

FIG. 3 illustrates the position of the lift wing when depositing a load;

FIG. 4 is a bottom plan view of the lift wing structure;

FIG. 5 is a front elevational view of the lift wing in flight;

FIG. 6 is a cross-section taken along lines 6—6 of FIG. 4;

FIG. 7 is a cross-sectional view taken along lines 7—7 of FIG. 4; and

FIG. 8 illustrates the lift-wing in the collapsed condition.

Although the present system is adaptable to a wide range of lifting and transporting applications for cargo loads in general, the present embodiment will be described in terms of application of the system to the yarding of logs and it will be understood that the application shown is by way of illustration and not limitation.

Referring now to the drawings, the overall system shown in FIG. 1 includes a yarder unit indicated generally at 1 which includes a generally horizontally extending boom 2 to better facilitate handling of the various lines of the system. Although a specific yarder and boom design is shown in connection with the illustrated embodiment of the inventtion, it will be understood that any number of yarder and boom or yarder and spar tower combinations are adaptable for the present invention and are available in the prior art.

As is conventional in high lead yarding systems, a haulback line 3 extends from a haulback winding drum 4 through a block or sheave 5 at the end of the boom 2 and through a number of corner blocks 6 located in the area to be logged. While yarding distances with conventional logging systems have been limited in the past, the present system enables yarding distances to be extended up to several thousand feet without the necessity of road building which is exceedingly costly in comparison to the volume of timber which may be harvested. Likewise in general cargo hauling applications, the system may be extended over a relatively long hauling distance. In the particular system illustrated, the haulback line 3 passes about a tail block 7 and is connected to the lift-wing 8 in a manner presently to be described.

The main line 9 extends from the main line winding drum 10 through a block and sheave 11 at the end of the boom 22 and is connected to the haulback line at the lift wing as will presently be described. As also shown in FIG. 1, a static lift balloon 12 of relatively small capacity is connected to the wing 8 by means of a tethering line 13. A load line 14 is connected to the wing 8 by means of a system of load distributing lines presently to be described, and may be provided with a swivel or the like 15 attached at its lower end for connecting conventional chokers 16 for lifting a turn of logs 17. It will be understood, of course, that the load supporting line 14 may be provided with any desirable device for attachment of the particular load being transported.

Referring now to FIGS. 4 through 7, the details of the lift-wing construction and its method of operation will be described in detail. As shown most clearly in FIG. 4, the lift-wing comprises a center strut 18 which may be made from circular tubing or any other desired cross-section and which is preferably constructed from a light weight metal having the necessary strength characteristics such as titanium, aluminum, or stainless steel alloys and the like. The forward end of the center strut is provided with a flattened portion 19 which may be made integral therewith or fixed thereto in any desirable manner and which mounts the pivot blocks 21 on the upper side thereof. The blocks 21 provide universal pivot connections for each of the side struts 22 which may be constructed from similar material as is used for the center strut 18. The side struts 22 are thus capable of being pivoted inwardly to a position parallel or substantially parallel to and overlying the center strut 18. Mounted to the center strut 18 is a slidable hanger indicated generally at 23 which includes the side plates 24 and an upwardly extending post 26 with a cross axle 27 for rotatably mounting the rollers 28. The post 26 extends through an elongated slot 29 in the bottom side of the strut 18 as shown in FIG. 6 and the rollers 28 are guided by the tracks 30 mounted inside of the strut 18. Each of the plates 24 is provided with a pivot block 31 which is fixed thereto and provides a universal pivotal connection 32 for the respective spreader rods 22. The spreader rods extend laterally from the hanger 23 and are connected to each of the side struts 22 by universal pivot connections 34. With this arrangement, it will be seen that forward sliding of the hanger 23 serves to spread the side struts 22 as shown in FIG. 4 and rearward sliding of the hanger serves to bring the side struts inwardly toward a position substantially parallel with the center strut 18. By virtue of the universal joints at the block 21 and the universal joints 32 and 34, the side struts 22 may be moved inwardly to a position substantially overlying the center strut. It will be understood, of course, that the slot 29 will be of sufficient length to allow full opening and closing of the side struts to the desired degree.

The wing surface 35 may be constructed from any suitable fabric material and weight and strength of which will depend upon the loads for which the wing is designed and other desired characteristics of the wing design. The fabric forming the wing surface 35 may be secured to the side struts 22 in any suitable fashion so as to insure permanent attachment and will likewise be secured to the top side of the center strut 18. In the alternative, it would be possible to make the surface 35 from separate pieces extending from the center strut outwardly to the side struts.

The tethering line 13 for the balloon 12 may be connected to the center strut 18 with a bridle system such as shown in FIG. 7 wherein a swivel 36 is connected to the tethering line 13 and to the bridle lines 37, 38 and 39 with the line 38 being located at a point in approximate vertical alignment with the point of connection of the load line 14. This configuration may be altered, however, without departing from the scope of the invention.

A similar bridle system is provided beneath the center strut 18 by means of the vertical line 40 attached to a hanger block 41 fixed to the strut 18 beneath the line 38 and additional lines 42 and 43 are connected to the forward and rear ends of the center strut respectively. These lines are all connected to a swivel 44 and, in addition, a plurality of load lines 45 extend downwardly from spaced positions along the side struts 22 and connect to the swivel 44. The load line 14 may be connected to the swivel 44 by means of an elastic section 46 comprising any well known form of bungee available in the prior art.

As illustrated most clearly in FIG. 7, the haulback line 3 is passed over a sheave or pulley 47 at the rear end of the center strut 18 and extends forwardly along the strut and around a second sheave 48 rotatably mounted between the plates 24 of the slidable hanger 23. The haulback line is then passed rearwardly and deadheaded at the rear end of the strut 18 as at 49. The main line 9 passes over a sheave 50 rotatably carried on the hanger block 41 and is tied to a ring 51 on the forward end of the hanger 23. To complete the structure of the lift-wing draw lines 52 are connected at one end to the rear end of the respective side struts 22 and passed through suitable rings 53 carried on the rear edge of the wing surface 35 and through a ring or opening in the riser 54 extending upwardly from the rear end of the strut 18. The other ends of the draw lines 53 are then connected to a fixed point 55 on the haulback cable. As will be understood from a description of the operation of the wing which follows, the point 55 at which the lines 52 are attached to the haulback line will be so located as to allow the struts 22 to extend laterally their full distance without interfering with the passage of the haulback line through the sheave 47. The lines 52 function as a gathering means for the fabric of the wings when the side struts 22 are in the inwardly folded position.

From the structure described, it will be obvious that the lift-wing will be in the spread or open position when the slidable hanger 23 is in the forward position shown in FIGS. 4 and 7 and rearward movement of the hanger will bring the side struts to the inwardly folded position as the rear end of the spreader rods 33 are moved rearwardly. FIG. 8 illustrates the closing movement of the side struts and the general appearance of the wing fabric as the wing is closed. In this manner the wing is furled and unfurled. Since the main line 9 and the haulback line 3 are, in effect, connected through the hanger 23, and by virtue of the passing of the haulback line about the sheave 48 and deadheading on the rear end of the strut 18, it will be seen that when pull is exerted on the main line 9 and tension is released in the haulback line 3, the hanger assembly 23 will be moved to its forward limit position so as to spread the wing member as it is towed forwardly against wind resistance. The degree to which the wing is spread, i.e. the amount of forward movement of the hanger 23 may be varied by varying the drag tension on the haulback line. Likewise, when the forward motion of the main line is halted and a pulling force is exerted on the haulback line the hanger assembly 23 will be moved rearwardly so as to collapse the wing and, if the main line is then payed out under slight tension, the wing may be towed rearwardly in the collapsed condition by the haulback line. Thus the opening and closing of the lift wing is controlled by the relative pulling force and drag tension exerted by the main and haulback lines. As aforementioned, the lift wing is held aloft at all times by the static lift balloon 12 through the tethering line 13. The recommended static lift is that which will maintain the wing structure in the neighborhood of approximately 200 feet from the surface in the unloaded condition. The balloon 12 may be located in the neighborhood of 800 feet above the lift wing in order to position the balloon in more stable air currents and to lessen the effect of the balloon drag on the wing when it is moved in either direction. These distances may be varied, however, depending upon the particular wind condition and upon other factors such as the static lift capabilities of the balloon. It will also be noted that the attitude at which the lift wing is caused to travel in the forward direction and hence the amount of aerodynamic lift obtained from any given wing span will be determined to a great extent by the positioning of the hanger 41 and sheave 50 along the length of the center strut 18. The optimum angle at which the wing is flown for any given load carrying application may be determined under operating conditions.

As previously explained, the gathering lines 52 are fixed at a position on the haulback line 3 so as not to interfere with the movement of the line over the sheave 47 when the hanger 23 is moved to the forward limit position. As the hanger is moved rearwardly to swing the side struts inwardly to the closed position, the lines 52 are drawn out by the haulback line and serve as a drawstring to gather the folds of the fabric of the wing 35 thereby holding the folds in the closed position to facilitate return of the wing on the haulback or return cycle.

As an alternative to the above described connecting means for the haulback and main lines, it would also be possible to connect the lines directly to a butt rigging at some point below the lines 40, 42, 43 and 45 such as at the swivel 44 for example. If this were done, other means, such as a remotely controlled motor, would have to be carried by the wing for the purpose of spreading the wing and controlling its attitude.

The operation of the lift-wing system in the yarding of logs or the transport of any other cargo will now be explained with specific reference to FIGS. 1, 2 and 3. Referring first to FIG. 2, and assuming that the lift-wing has been returned to the pickup point as shown in dotted lines, the balloon 12 will be located directly above the left-wing so as to maintain it aloft. The wing is held in the collapsed condition by breaking or holding the main line 9 and maintaining tension on the haulback line 3 so as to move the hanger 23 to its rearward position. The tail block 7 will be so located as to cause the haulback line to lower the wing slightly to provide slack in the load line 14 to facilitate the setting of the chokers 16. As soon as the chokers are set, the tension on the haulback line 3 is released and a pull is exerted on the main line 9 with the result of pulling the hanger 23 to its forward limit position so as to spread or unfurl the wing 8 as it begins to lift. Immediately upon releasing the haulback line 3 the static lift of the balloon 12 will serve to remove most of the slack from the load line 14 but will be insufficient to lift the turn of logs. As soon as the wing is unfurled and begins to lift, the main line 9 is hauled in rapidly and the full aerodynamic lift of the wing is applied to lift the logs from the ground. The bungee or shock absorber 46 serves to lessen the shock load on the wing, and as the main line continues to be hauled in, the logs are flown toward the landing adjacent the yarder 1. As the logs and the lift-wing approach the landing, a guinea line 56 which passes through an anchor block 57 and is attached to a block 58 riding on the main line, is hauled in so as to lower the lift wing. At the same time, the speed of the main line is decreased and the drag tension on the haulback line is increased so as to begin collapsing of the lift-wing thus depositing the load of logs or other cargo.

As soon as the logs are landed, the main line is halted and pulling force is extended on the haulback line so as to completely collapse the wing. As soon as the wing is collapsed, the main line is allowed to be payed out with sufficient drag being maintained to hold the wing in the collapsed condition as it is returned to the pickup location. When the wing is in position at the pickup location, the main line is braked and halted and sufficient tension is maintained on the haulback line to keep the wing collapsed until another lift and transport cycle is begun.

From the foregoing description of the preferred embodiment of the method and system, it will be apparent to those skilled in the art that a much improved load lifting and transport system concept is provided by the present invention. The arrangement and types of structural components utilized and the particular method steps described may be subjected to numerous modifications well within the purview of this invention and applicant intends only to be limited to a liberal interpretation of the specifications and appended claims.

Having thus described the invention, what is claimed as new and desired to be secured by Letters Patent is:

1. In combination; a line hauling system for moving a load between spaced points on the earth's surface, an aerodynamic lift-wing for applying vertical lift to said load when moved by said line hauling system, a lighter-than-air lift vehicle, and means connecting said vehicle to said wing to maintain the same above the surface.

2. The combination according to claim 1 wherein; said lift-wing is foldable between an open position for obtaining vertical lift and a closed position for towing without lift, and means to open said wing when towed from a load pick-up point to a load depositing point and to fold said wing to the closed position when towed in the reverse direction.

3. A load lifting and transport system comprising in combination; an aerodynamic lift-wing, a line hauling system connected for towing said wing to obtain vertical aerodynamic lift, means to connect a load to be transported to said lift-wing, and lighter-than-air static lift means connected to and spaced vertically from said lift-wing.

4. A load lifting and transport system comprising in combination; a line hauling system for moving a load between spaced points on the earth's surface, said line hauling system including first and second hauling lines and separate line hauling means for selectively hauling in and paying out said lines, a lift-wing having an aerodynamic lift surface, said first and second lines having the free ends thereof connected to said lift-wing for towing the same to obtain vertical aerodynamic lift, means to connect a load to said lift-wing, a lighter-than-air static lift device, and tethering means for connecting said static lift device in vertical spaced relation to said lift-wing, said static lift device providing at least enough vertical lift to maintain said lift-wing above the surface, whereby said load may be lifted and transported by the aerodynamic lift of said wing when towed by said line hauling system.

5. The combination according to claim 4 wherein; said lift-wing is foldable between an open position for obtaining vertical lift and a closed position for towing without lift, and means to open said wing when towed from a load pick-up point to a load depositing point and to fold said wing to the closed position when towed in the reverse direction.

6. The combination according to claim 5 wherein; said means for opening and closing said lift-wing is operated in response to the differential pulling force exerted by said first and second hauling lines respectively.

7. The combination according to claim 6 wherein said lift wing comprises; an elongated center strut, first and second side struts pivoted at one end thereof to the forward end of said center strut, a flexible fabric material connected to said center and side struts to form a foldable wing surface, a slidable hanger mounted for longitudinal reciprocation along said center strut, spreader rods pivotally connected to said hanger and extending laterally outwardly and pivotally connected to said side struts, and means for connecting said hauling lines to said slidable hanger whereby the longitudinal position of said hanger is controlled by the differential pulling force exerted by said lines.

8. The combination according to claim 7 wherein said means for connecting said hauling line to said slidable hanger comprises; a first sheave mounted in fixed position on the forward portion of said center strut, first hauling lines passing over said first sheave and being connected to the forward end of said slidable hanger, a second sheave mounted in fixed position on the rear portion of said center strut, and a third sheave carried by said slidable hanger, said second hauling line being passed over said second sheave and about said third sheave and deadheaded on said center strut adjacent the second sheave to form a two part pulling line.

9. The combination according to claim 8 wherein; said first line is positioned to tow the wing in a forward direction from the pick-up point to the load depositing point, the longitudinal position of said slidable hanger being determined by the amount of drag force exerted on said second hauling line during forward movement of the wing to control the degree of opening of the wing to determine the amount of aerodynamic lift exerted by the wing to lift loads of varying weights, said second line being operable to effect immediate opening of the wing and application of lifting force to the desired degree upon hauling in said first hauling line.

10. The combination according to claim 9 wherein the forward end of said wing is at all times directed toward the load depositing point.

11. A method for lifting and transporting loads between two spaced points on the earth's surface comprising; connecting an aerodynamic lift-wing between the ends of two reversible direction hauling lines, holding said lift-wing above the surface with a lighter-than-air vehicle spaced vertically above said wing, suspending a load to be transported below said wing and then hauling in on one of said lines to apply the aerodynamic lift of said wing to lift and transport said load.

12. The method according to claim 11 including the step of controlling the lift capacity of said wing by the differential pulling force exerted by said lines.

13. The method according to claim 12 including holding said wing disposed in a direction generally facing a load depositing point, opening said wing to a lift position during travel toward the load depositing point and collapsing the wing during travel toward a load pick-up point.

14. The method according to claim 11 wherein said lift-wing is foldable between an opened and closed position and including the steps of; holding said wing in the open position during the load carrying cycle, and holding said wing in the closed position in the return cycle.

References Cited
UNITED STATES PATENTS
3,151,825  10/1964  Kindling _____ 244—33

OTHER REFERENCES
The Wingfoot Clan, vol. 23, No. 6, "Giant Balloons May Change Course of Logging Industry," one page.

ARTHUR L. LA POINT, *Primary Examiner.*

D. F. WORTH, *Assistant Examiner.*